(12) United States Patent
Schroeder et al.

(10) Patent No.: US 6,320,374 B1
(45) Date of Patent: Nov. 20, 2001

(54) ANGULAR POSITION AND ANGULAR DIRECTION SENSOR

(75) Inventors: Thaddeus Schroeder, Rochester Hills; Bruno Patrice Bernard Lequesne, Troy, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/339,450

(22) Filed: Jun. 24, 1999

(51) Int. Cl.[7] ........................................ G01B 7/30

(52) U.S. Cl. ........................ 324/207.25; 324/207.21; 324/165

(58) Field of Search ................. 324/207.25, 207.21, 324/207.2, 207.18, 165; 340/672

(56) References Cited

U.S. PATENT DOCUMENTS 4,370,614 * 1/1983 Kawada et al. .................. 324/165

* cited by examiner

Primary Examiner—Walter Snow
(74) Attorney, Agent, or Firm—Margaret A. Dobrowitsky

(57) ABSTRACT

In an angle-based crankshaft position sensing system, an electrical circuit is provided for also sensing the direction of rotation of the crankshaft. A slotted target wheel is coupled to the crankshaft and a single dual-element MR sensor is juxtaposed with the target wheel. The elements generate respective detection signals when a slot passes by the elements, with the position of the slot being indicated as being directly under the sensor at the point in time when the detection signals intersect each other. Also, square waves are generated for each detection signal, and when the magnitude of the second square wave is non-zero when the falling edge of the first square wave occurs, a clockwise rotation is indicated. On the other hand, if the magnitude of the second square wave is zero when the falling edge of the first square wave occurs, a counterclockwise rotation is indicated.

22 Claims, 3 Drawing Sheets

US 6,320,374 B1

ANGULAR POSITION AND ANGULAR DIRECTION SENSOR

TECHNICAL FIELD

The present invention relates generally to crankshaft target wheels, and more particularly to systems and methods for determining position and direction of rotation of rotating shafts with a single sensor.

BACKGROUND OF THE INVENTION

A target wheel is a disk that is engaged with a vehicle crankshaft and that is configured for inducing signals in one or more sensors positioned next to the target wheel, with the signals representing the angular position of the crankshaft. These position signals can be used in distributorless ignition systems that have selectively energized ignition coils that fire the spark plugs as appropriate for the angular position of the crankshaft. Moreover, the crankshaft angular position signals can be used for combustion control and diagnostic functions.

Examples of target wheels are set forth in, e.g., U.S. Pat. No. 5,754,042, incorporated herein by reference, and in co-pending U.S. patent application Ser. No. 09/250,826, filed Feb. 17, 1999, also incorporated herein by reference. Essentially, the edge of the disk-shaped wheel is varied along the periphery of the wheel in some fashion, e.g., by cutting slots in the periphery in a predetermined pattern. Usually, one or two sensors are used to detect the slots as they pass by the sensors, with the detected slot pattern being correlated to a crankshaft angular position and, when two sensors are used, also to a crankshaft direction of rotation. Unfortunately, when two sensors are used instead of one, as currently must be done to sense direction of crankshaft rotation, the cost and complexity of such systems is increased. The present invention has recognized the above-noted problems and has provided the below solutions to one or more of the above-noted problems.

SUMMARY OF THE INVENTION

A method for sensing the direction of motion, e.g., rotation, of a moving, e.g. rotating, body that defines a periphery and at least one peripheral anomaly includes providing a single sensor with first and second sensor elements, preferably by providing first and second magnetoresistor (MR) elements on a single MR die. First and second signals are respectively received from the elements, and then a magnitude that is related to the second signal is determined at a point in time that is contemporaneous with an edge related to the first signal. A direction signal is then generated in response which represents the direction of rotation of the rotating body.

In a preferred embodiment, a baseline magnitude is established, and the first and second signals establish respective first and second detection signals when an anomaly is sensed. The anomaly can be a slot, or tooth, or other magnetic mark on a target wheel of a crankshaft. The preferred method further includes establishing the position of the anomaly at a time when the first and second detection signals intersect each other.

As disclosed in greater detail below, the detection signals can define respective first and second detection signal magnitudes, and the method includes establishing a trigger magnitude. Further, the method includes establishing respective first and second square waves for the first and second detection signals, with each square wave being established for the period when the trigger magnitude is between the baseline magnitude and the respective detection signal magnitude. In a particularly preferred embodiment, the magnitude that is related to the second signal is a magnitude of the second square wave, and the edge that is related to the first signal is a leading edge or falling edge of the first square wave.

In another aspect, a device is disclosed to determine the direction of rotation of a crankshaft that is coupled to a trigger wheel having anomalies formed thereon. The device includes first and second anomaly detection signal generators generating respective first and second detection signals when an anomaly of the trigger wheel is juxtaposed with the signal generators. Each detection signal defines a respective first or second magnitude, and each detection signal also establishes a respective first or second edge. An electrical circuit receives the detection signals and identifies the second magnitude when the first edge is sensed, with the detection circuit generating a direction signal in response to sensing the first edge.

In still another aspect, an electrical circuit is disclosed for outputting a direction signal representative of the direction of rotation of a rotating shaft coupled to a wheel that bears peripheral anomalies. The circuit includes first and second sensor elements generating respective first and second detection signals when an anomaly is sensed. Means are provided for determining a magnitude related to the second signal at a point in time contemporaneous with an edge related to the first signal. Also, means generate a direction signal representative of the direction of rotation of the rotating body in response to the means for determining.

The details of the present invention, both as to its structure and operation, can best be understood in reference to the accompanying drawings, in which like reference numerals refer to like parts, and in which:

DESCRIPTION OF THE PREFERRED EMBODIMENT

Figure 1:
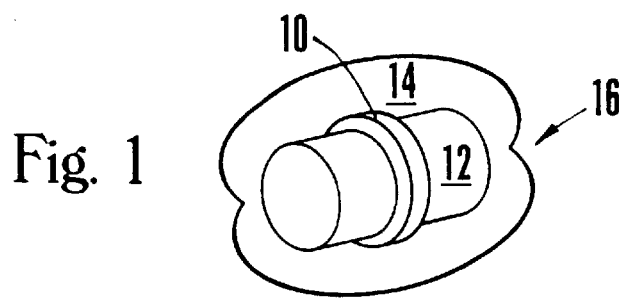
FIG. 1 is a schematic view of the present target wheel engaged with a crankshaft of an engine.

Referring initially to FIG. 1, a target wheel 10 is shown in operative engagement with a crankshaft 12 of an engine 14 in a vehicle, generally designated 16. As set forth further below, the target wheel 10 can be used with VR or MR sensors, more preferably with a single dual-element MR sensor, to sense the angular position and direction of rotation of the crankshaft 12 relative to the engine 14 without accounting for the speed or acceleration of the crankshaft 12. Hence, the preferred system is an angle-based system. Although intended for crankshaft position applications, the present invention can be used to generate signals representative of the angular position and rotational direction of rotating shafts other than crankshafts, without having to account for the speed and acceleration of the shafts.

Figure 2:
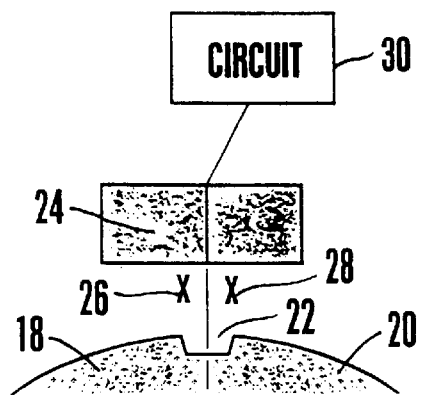
FIG. 2 is a schematic plan view of the present target wheel in juxtaposition with an MR sensor, with portions broken away.

Now referring to FIG. 2, the target wheel 10 includes a generally disk-shaped wheel body 18 having a periphery, generally designated 20. As can be appreciated in reference to FIG. 2, the otherwise round periphery 20 is formed with at least one and preferably plural peripheral magnetic anomalies such as slots 22. It is to be understood that instead of slots, teeth can be used to establish the peripheral anomalies, or some combination of teeth and slots. In one preferred embodiment, the pattern established by the slots 22 can be similar or identical to the pattern disclosed in U.S. Pat. No. 5,754,042, incorporated herein by reference.

In the embodiment shown in FIG. 2, a magnetic field sensor 24 is closely juxtaposed with the target wheel 10 to sense the passage of slots 22 beneath the sensor 24. In the preferred embodiment, one and only one dual-element MR sensor 24 is provided, to reduce the cost and complexity of the present system. The sensor 24 accordingly includes first and second MR elements 26, 28 that can be established by magnetoresistors. Indium-Antimony (InSb) magnetoresistors are preferred, but other sensors, e.g., Hall sensors or other magnetoresistors, may be used. FIG. 2 shows that the sensor 24 is electrically connected to an analog or digital signal processing circuit 30 that processes the signals from the sensor 24 in accordance with principles set forth below.

Figure 3:
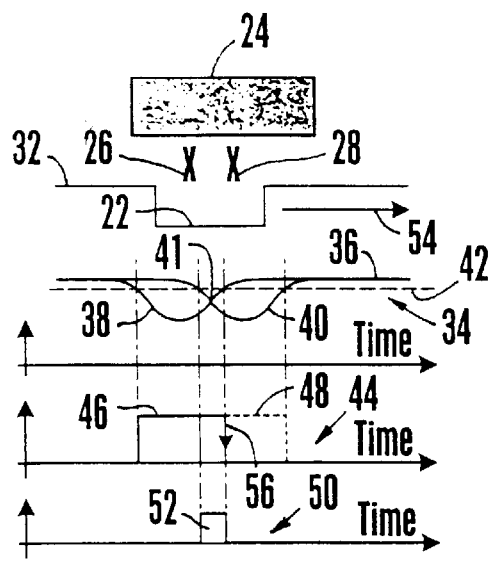
FIG. 3 is a graph of the signals generated by the sensor shown in FIG. 2 using the circuit shown in FIG. 5, as a function of target wheel angular position when the wheel is turning clockwise.

FIG. 3 illustrates the signals that are generated by the sensor 24, with the x-axis representing time and the y-axis representing signal magnitude. The top graph line 32 in FIG. 3 represents the periphery 20 by showing a single slot 22, as labelled in FIG. 3. The second graph line 34 in FIG. 3 illustrates the respective detection signals that are generated by the elements 26, 28 as the slot 22 passes the sensor 24. As shown, when no slot is sensed, the signals are flat, and establish a baseline magnitude 36. On the other hand, in the presence of a slot the elements 26, 28 respective generate sinusoidal-shaped detection signals 38, 40 that intersect each other (i.e., have equal amplitudes) at a point in time 41. Also, a constant trigger magnitude is established below the baseline magnitude 36 and indicated at dashed line 42 in accordance with disclosure below. It is to be understood that in the case of teeth that rise from the periphery 20 of the target wheel 10 instead of slots that are cut into the periphery, the detection signals will be positive half-waves, instead of the negative half-waves shown, and the trigger magnitude will be greater than the baseline magnitude, instead of less than the baseline magnitude.

A third graph line 44 represents first and second square waves 46, 48 that are respectively related to the first and second detection signals 38, 40. More specifically, it is to be appreciated in reference to FIG. 3 that the first square wave 46 (in solid lines) is established for the period during which the amplitude of the first detection signal 38 remains below the trigger magnitude 42. Likewise, the second square wave 48 (partially shown in dashed lines) is established for the period during which the amplitude of the second detection signal 40 remains below the trigger magnitude 42. Accordingly, the square waves 46, 48 overlap each other in time, with each square wave defining a zero magnitude when no slot is sensed and a non-zero, constant magnitude when the detection signals are below the trigger magnitude 42.

FIG. 3 also shows a fourth graph line 50 which illustrates a position window 52 that is centered on the intersection point in time 41. As described further below, the window 52 can be used to indicate a time at which the slot 22 is directly beneath the sensor 24 and, hence, to indicate an angular position of the target wheel 10.

Figure 4:
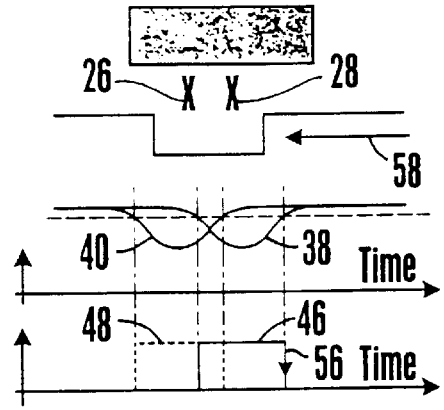
FIG. 4 is a graph of the signals generated by the sensor shown in FIG. 2 using the circuit shown in FIG. 5, as a function of target wheel angular position when the wheel is turning counterclockwise, with the fourth graph line omitted for clarity.

When the direction of rotation of the target wheel 10 (and, hence, crankshaft 12) is clockwise as indicated by the arrow 54, we have discovered that at the point in time when the falling edge 56 of the first square wave 46 occurs, the magnitude of the second square wave 48 is non-zero. Contrast that with the wave relationship shown in FIG. 4, showing the signals that are generated when the target wheel is turning counterclockwise as indicated by the arrow 58. Under the circumstances shown in FIG. 4, at the point in time when the falling edge 56 of the first square wave 46 occurs, the magnitude of the second square wave 48 is zero as shown. Thus, by measuring the magnitude of the second square wave 48 at the falling edge of the first square wave 46, the direction of rotation of the wheel 10 can be ascertained. It is to be understood that the above principles apply (using inverse polarities and edges, where appropriate, with the detection signals 38, 40 establishing positive half-waves instead of negative half-waves) when teeth protrude from the periphery 20 of the wheel 10, instead of the case shown for slots 22 extending into the periphery 20.

Figure 5:
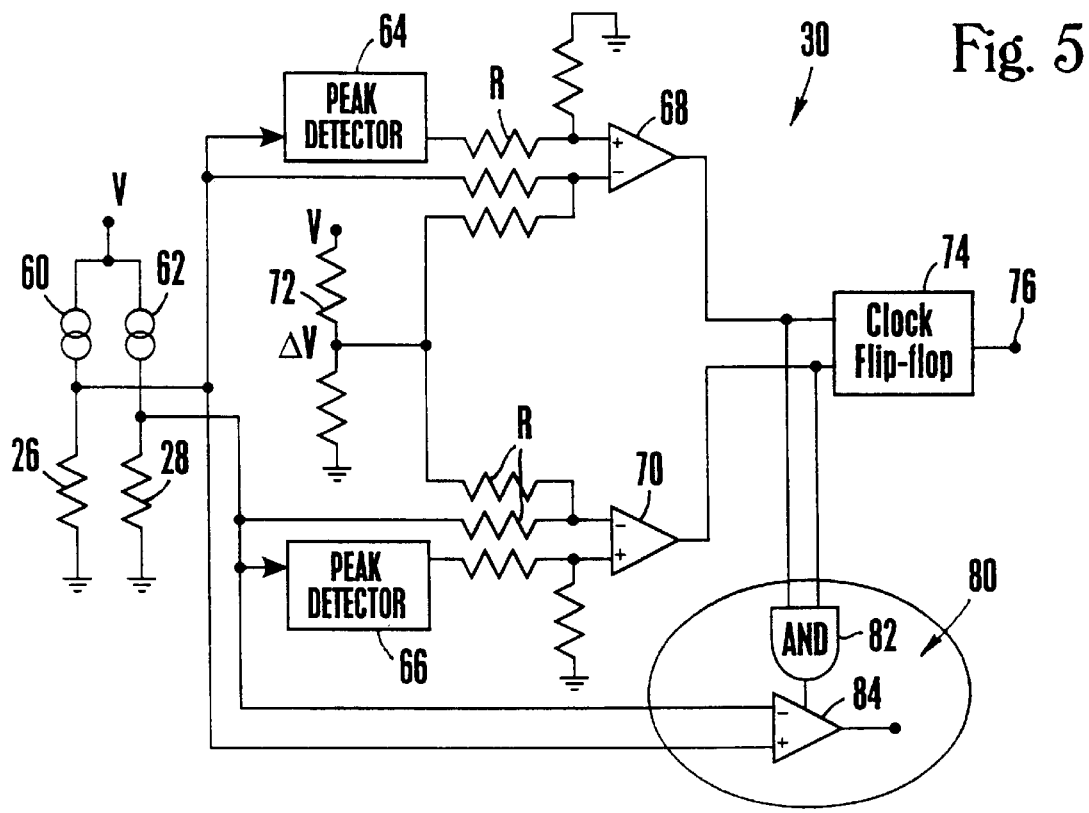
FIG. 5 is a schematic diagram of the electrical circuit used by the system shown in FIG. 2.

FIG. 5 shows one example of the circuit 30. It is to be understood that the logic underlying the analog circuit shown in FIG. 5 can be undertaken by a digital circuit such as might be embodied in software or discrete logic. As shown in FIG. 5, current sources 60, 62 respectively energize the MR elements 26, 28, with the detection signals developed by the elements 26, 28 being sent to first and second peak detectors 64, 66, respectively. If desired, only a single peak detector need be used, since under normal circumstances the signals from the MR elements 26, 28 are balanced. Their peak values should thus be the same, or very close to the same.

The peak detectors 64, 66 capture the baseline (no anomaly detection) signals from the elements 26, 28. In this way, the baseline magnitude is established. Furthermore, the detection signals from the first and second elements 26, 28 are respectively sent to first and second comparators 68, 70, with various circuit resistors R being employed in accordance with circuit principles known in the art.

As shown in FIG. 5, the comparators 68, 70 receive input signals from a voltage divider circuit 72. The purpose of the voltage divider circuit 72 is to output a ?V signal (on the order of five millivolts) to the comparators 68, 70. The ?V signal is subtracted from the detection signals and then the now-smaller detection signals compared to the baseline magnitude by the comparators 68, 70. The comparators 68, 70 respectively output the first and second square waves 46, 48 shown in FIG. 3, which are input to a flip-flop 74. In turn, the flip-flop 74 generates a direction signal at pin 76 that represents the direction of rotation of the trigger wheel 10 based on whether the magnitude of the second square wave 48 is zero or non-zero at the falling edge 56 of the first square wave 46 in accordance with above principles.

It may now be appreciated that the ?V signal is established to be sufficiently large to filter system noise, but sufficiently small so that the trigger magnitude is between the baseline magnitude and the magnitude of the detection signals when the detection signals intersect each other, i.e., to ensure that the trigger magnitude is greater (when trigger wheel slots are used) or less (when trigger wheel teeth are used) than the magnitudes of the detection signals at the intersect point 41.

If desired, a separate circuit can be provided for outputting a trigger wheel angular position signal, based on the window 52 shown in FIG. 3. As shown in FIG. 5, however, the present circuit can incorporate such a circuit, generally designated 80. As shown, the outputs of the comparators 68, 70 can be sent to an AND circuit 82 to be added together to "open" the window 52 shown in FIG. 3. The output of the AND circuit 82 is sent to a position comparator 84, which also receives, as input signals, the detection signals 38, 40 from the MR elements 28, 30. Hence, the position comparator 84 is given, as input, signals representing when the detection signals 38, 40 intersect. The position comparator 84 accordingly processes the input signals and outputs, at pin 86, a signal representative of when the slot 22 was detected and, hence, representative of the angular position of the target wheel 10.

Figure 6:
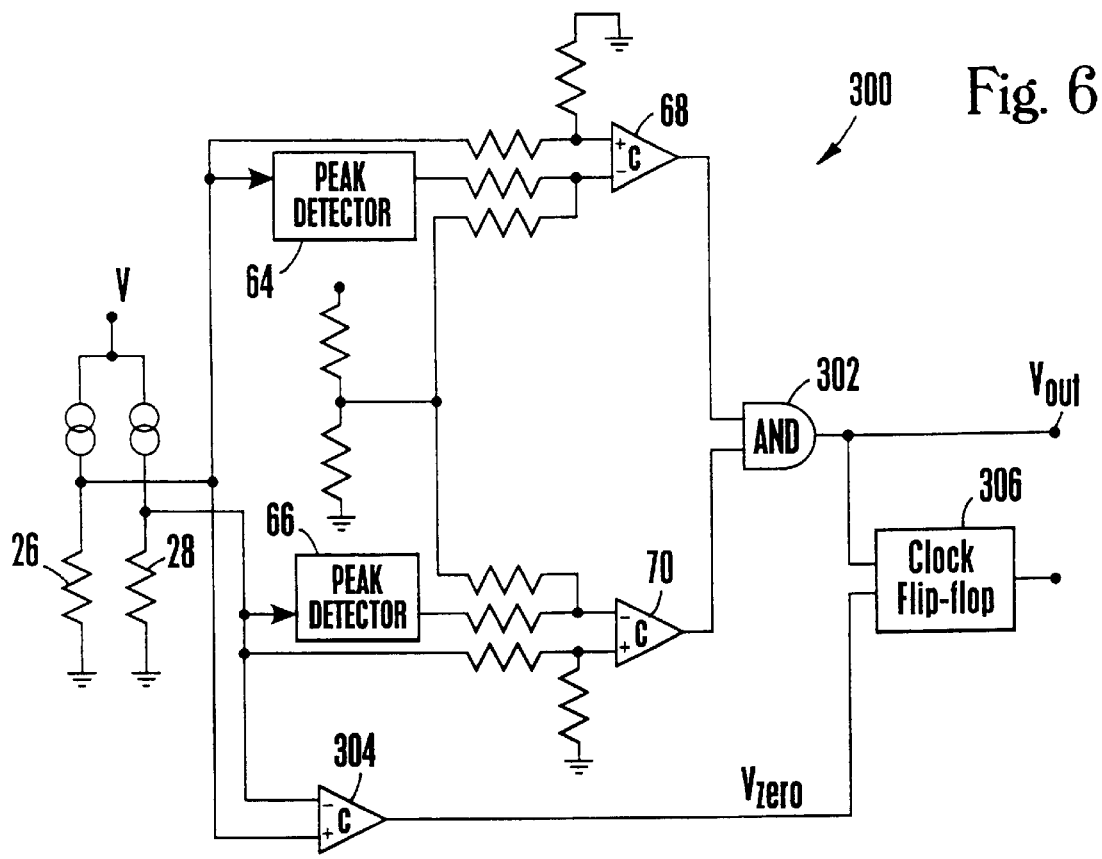
FIG. 6 is a schematic diagram of an alternate electrical circuit.

FIG. 6 shows an alternate circuit, generally designated 300, that is in all essential respects identical in construction and operation to the circuit 30 shown in FIG. 5, with the following exceptions. The circuit 300 in FIG. 6 provides a relatively symmetrical detection of motion relative to the intersection point 41 (FIG. 3) vis-a-vis clockwise and counterclockwise rotation. As was the case in the previous circuit 30, the detection signals from the first and second elements 26, 28 are respectively sent through peak detectors to first and second comparators which for consistency of disclosure have been labelled 68, 70. Unlike the circuit 30, however, in the circuit 300 the outputs of the comparators 68, 70 are sent to an AND circuit 302, which outputs ("$V_{out}$") the logical AND product of the square waves derived from the detection signals. It will be appreciated that the output signal $V_{out}$ of the AND circuit 302 represents a window around the time at which the center position of the slot that induced the detection signals was directly opposite the sensor 24. Thus, $V_{out}$ represents the angular position of the trigger wheel 10 with more accuracy than a circuit that detects the edges of slots and teeth, as opposed to the center of slots and teeth as does the circuit of FIG. 6.

Additionally, a zero crossing detector 304 receives the detection signals from the MR elements 26, 28 and outputs a zero crossing signal $V_{zero}$, representing the difference between the detection signals, to a flip-flop 306. Also, the flip-flop 306 receives the output signal $V_{out}$ of the AND circuit 302. With these two inputs, the output of the flip-flop 306 is high when the trigger wheel is turning clockwise, and low when the trigger wheel turns counterclockwise, thus representing the direction of rotation of the wheel (and, hence, crankshaft 12) using only a single dual-element MR sensor. This is because, as recognized herein, $V_{zero}$ is low at the time of the falling edge of $V_{out}$ during clockwise rotation, whereas $V_{zero}$ is high at the time of the falling edge of $V_{out}$ during counterclockwise rotation.

In some cases, the baseline magnitude might differ between MR sensors. A sufficient hysteresis might accordingly be required on the zero crossing detector 304. Alternatively, is may be preferable to enable $V_{zero}$ only within a window created by an ORing of the detection signals.

It is to be understood that instead of using a signal falling edge, the leading edge of $V_{out}$ can be used. In such a case, the flip-flop 306 would be clocked on the leading edge, and its inverse output would be used to obtain the direction of rotation signal.

Figure 7:
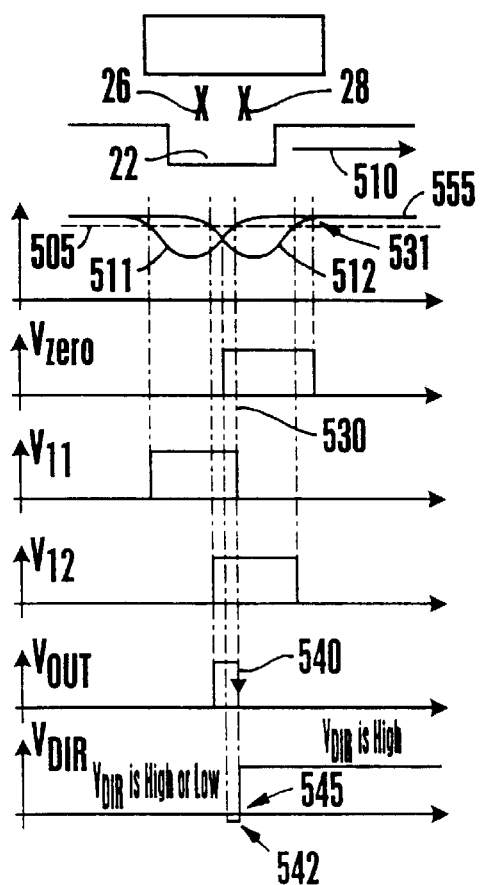
FIG. 7 is a graph of the signals used in the circuit of FIG. 6, as a function of target wheel angular position when the wheel is turning clockwise.
Figure 8:
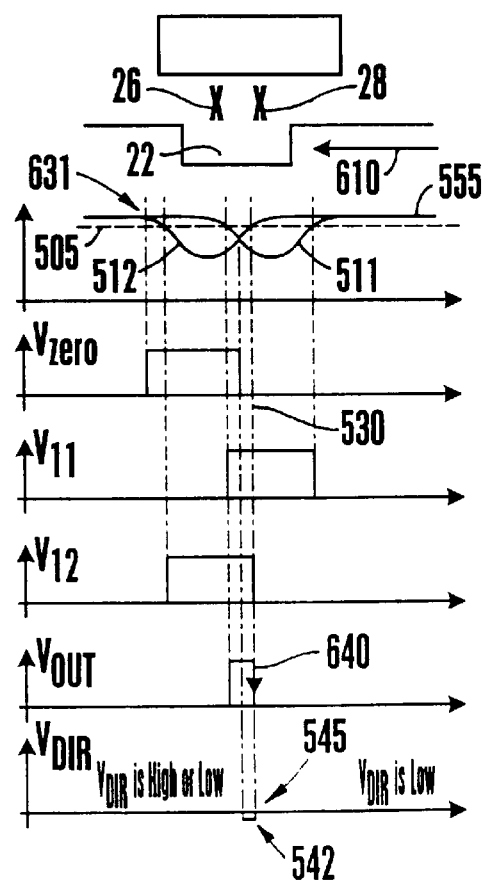
FIG. 8 is a graph of the signals used in the circuit of FIG. 6, as a function of target wheel angular position when the wheel is turning counterclockwise.

FIGS. 7 and 8 illustrate the signals of the circuit of FIG. 6 for the two directions of rotation. The arrow 510 in FIG. 7 represents clockwise rotation, while the arrow 610 in FIG. 8 represents counterclockwise rotation.

Curves 511 and 512 in FIGS. 7 and 8 represent the signals that are output by the MR elements 26, 28. The peak detectors 64, 66 receive these signals to detect the baseline magnitude 555, and a trigger magnitude 505 (i.e., somewhat less than the baseline magnitude) is generated as discussed above. Comparing the trigger magnitude 505 with the curves 511, 512 creates the square wave signals labelled $V_{11}$ and $V_{12}$ on the third and fourth lines of FIGS. 7 and 8. The square wave intersection of the signals $V_{11}$ and $V_{12}$ is obtained by the AND circuit 302 (FIG. 6) and is shown on the fifth line of FIGS. 7 and 8 and designated $V_{out}$. It is to be appreciated that $V_{out}$ is a window around the position of the slot center, shown in FIGS. 7 and 8 at 530. Additionally, $V_{zero}$ is generated as described above by the zero crossing detector 304.

With the above discussion in mind, for the clockwise rotation shown in FIG. 7, the rising edge of $V_{zero}$ is indicated at 530 when the input signals 511, 512 cross, and $V_{zero}$ remains up until the time indicated at 531. On the other hand, for the counterclockwise rotation shown in FIG. 8, the rising edge of $V_{zero}$ is indicated at 631 when the input signal 512 starts to drop, and $V_{zero}$ remains up until the time indicated at 530. The signal $V_{zero}$ is well-defined by the direction of rotation at the time of the falling edge 540 (FIG. 7) or 640 (FIG. 8) of $V_{out}$: for clockwise rotation, $V_{zero}$ is high at this point, and for counterclockwise rotation, low. The flip-flop 306 shown in FIG. 6 uses this information to generate the direction of rotation signal $V_{dir}$, whose state is updated at 545. The temporal location of the event that occurs at time 545, which determines the state change for the direction of rotation signal $V_{dir}$, is always the same, regardless of the direction of motion. As seen in FIGS. 7 and 8, time 545 is spaced from the center of the slot by the same amount (indicated at 542) in both the clockwsie and counterclockwise case, thus advantageously providing symmetry between both cases and, thus, permitting the use of simpler electronics.

While the particular CRANKSHAFT POSITION AND DIRECTION SENSING SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A method for sensing the direction of motion of a moving body defining a periphery and at least one peripheral anomaly, comprising the acts of:
   providing first and second sensor elements;
   receiving respective first and second signals from the elements;
   determining a magnitude related to the second signal at a point in time contemporaneous with an edge related to the first signal; and
   generating a direction signal representative of the direction of motion of the moving body in response to the determining step.

2. A device to determine the direction of rotation of a crankshaft coupled to a trigger wheel having anomalies formed thereon, comprising:
   first and second anomaly detection signal generators generating respective first and second detection signals when an anomaly of the trigger wheel is juxtaposed with the signal generators, each detection signal establishing a respective related first or second magnitude, each detection signal establishing at least one respective related first or second edge; and
   an electrical circuit receiving the detection signals and identifying the second magnitude when the first edge is sensed, the detection circuit generating a direction signal in response thereto.

3. The device of claim 2, in combination with the trigger wheel.

4. The device of claim 3, in combination with an engine crankshaft.

5. The device of claim 4, in further combination with an engine.

6. An electrical circuit for outputting a direction signal representative of the direction of rotation of a rotating shaft coupled to a wheel that bears peripheral anomalies, comprising:
   first and second sensor elements on a single sensor generating respective first and second detection signals when an anomaly is sensed;
   means for determining a magnitude related to the second signal at a point in time contemporaneous with an edge related to the first signal; and
   means generating a direction signal representative of the direction of rotation of the rotating body in response to the means for determining.

7. The device of claim 2, wherein the detection signal generators are MR elements associated with a common sensor.

8. The circuit of claim 6, wherein the elements are MR elements associated with a single sensor.

9. A method for sensing the direction of motion of a moving body defining a periphery and at least one peripheral anomaly, comprising the acts of:
   providing first and second sensor elements;
   receiving respective first and second signals from the elements;
   determining a magnitude related to the second signal at a point in time contemporaneous with an edge related to the first signal;
   generating a direction signal representative of the direction of motion of the moving body in response to the determining step; and
   establishing a baseline magnitude, wherein the first and second signals establish respective first and second detection signals when an anomaly is sensed.

10. The method of claim 9, wherein the method acts further comprise establishing the position of an anomaly at a time when the first and second detection signals intersect each other.

11. The method of claim 10, wherein the detection signals define respective first and second detection signal magnitudes, and the method acts further comprise:
    establishing a trigger magnitude; and
    establishing respective first and second square waves for the first and second detection signals, each square wave being established for the period when the trigger magnitude is between the baseline magnitude and the respective detection signal magnitude.

12. The method of claim 11, wherein the magnitude related to the second signal is a magnitude of the second square wave, and wherein the edge related to the first signal is a leading edge or falling edge of the first square wave.

13. The method of claim 12, wherein the anomaly is a slot, the edge is a falling edge, and the direction signal indicates a clockwise rotation when the magnitude of the second square wave is non-zero, and otherwise the direction signal indicates a counterclockwise direction.

14. The method of claim 11, wherein the trigger magnitude is established to be between the baseline magnitude and the magnitude of the detection signals when the detection signals intersect each other.

15. A device to determine the direction of rotation of a crankshaft coupled to a trigger wheel having anomalies formed thereon, comprising:
    at least one engine;
    at least one crankshaft within the engine;
    at least one trigger wheel coupled to the crankshaft;
    first and second anomaly detection signal generators generating respective first and second detection signals when an anomaly of the trigger wheel is juxtaposed with the signal generators, each detection signal establishing a respective related first or second magnitude, each detection signal establishing at least one respective related first or second edge; and
    an electrical circuit receiving the detection signals and identifying the second magnitude when the first edge is sensed, the detection circuit generating a direction signal in response thereto, the electrical circuit establishing the position of an anomaly at a time when the first and second detection signals intersect each other.

16. The device of claim 15, wherein a trigger magnitude and a baseline magnitude are established in the circuit, and the circuit establishes respective first and second square waves for the first and second detection signals, each square wave being established for the period when the trigger magnitude is between the baseline magnitude and the respective detection signal magnitude.

17. The device of claim 16, wherein the related second magnitude is a magnitude of the second square wave, and the related edge is a leading edge or falling edge of the first square wave.

18. The device of claim 17, wherein at least one anomaly is a slot, the edge is a falling edge, and the direction signal indicates a clockwise rotation when the magnitude of the second square wave is non-zero, and otherwise the direction signal indicates a counterclockwise direction.

19. The device of claim 18, wherein the trigger magnitude is established to be between the baseline magnitude and the magnitude of the detection signals when the detection signals intersect each other.

20. An electrical circuit for outputting a direction signal representative of the direction of rotation of a rotating shaft coupled to a wheel that bears peripheral anomalies, comprising:

first and second sensor elements on a single sensor generating respective first and second detection signals when an anomaly is sensed;

means for determining a magnitude related to the second signal at a point in time contemporaneous with an edge related to the first signal;

means for generating a direction signal representative of the direction of rotation of the rotating body in response to the means for determining; and means for establishing the position of an anomaly at a time when the first and second detection signals intersect each other.

21. The circuit of claim 20, wherein the detection signals define respective first and second detection signal magnitudes, and the circuit further comprises:

means for establishing respective first and second square waves for the first and second detection signals, each square wave being established for the period when a predetermined trigger magnitude is between a predetermined baseline magnitude and the respective detection signal magnitude.

22. The circuit of claim 20, wherein the trigger magnitude is established to be between the baseline magnitude and the magnitude of the detection signals when the detection signals intersect each other.

* * * * *